(12) United States Patent
Kim et al.

(10) Patent No.: US 9,791,607 B2
(45) Date of Patent: Oct. 17, 2017

(54) OPTICAL ELEMENT

(71) Applicant: LG CHEM, LTD., Seoul (KR)

(72) Inventors: Sin Young Kim, Daejeon (KR); Ji Youn Lee, Daejeon (KR); Moon Soo Park, Daejeon (KR); Hyuk Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 154 days.

(21) Appl. No.: 14/626,080

(22) Filed: Feb. 19, 2015

(65) Prior Publication Data

US 2015/0177435 A1 Jun. 25, 2015

Related U.S. Application Data

(63) Continuation of application No. PCT/KR2014/009169, filed on Sep. 30, 2014.

(30) Foreign Application Priority Data

Sep. 30, 2013 (KR) .......................... 10-2013-0117070
Sep. 30, 2014 (KR) .......................... 10-2014-0130802

(51) Int. Cl.
*G02F 1/1335* (2006.01)
*G02B 5/30* (2006.01)
*G02B 27/26* (2006.01)

(52) U.S. Cl.
CPC ............ *G02B 5/3016* (2013.01); *G02B 27/26* (2013.01)

(58) Field of Classification Search
CPC ......... G02F 1/133528; G02F 1/133536; G02F 1/13363; G02F 2001/133543; G02F 1/133362; G02F 1/133634; G02B 5/3033; G02B 5/3036; G02B 5/3016; G02B 5/3083; G02B 27/2214; G02B 27/26; G02B 5/3025; G02B 27/281; H04N 13/0404
USPC ..................................... 349/96, 194, 117, 15
See application file for complete search history.

(56) References Cited

U.S. PATENT DOCUMENTS

| | | | | |
|---|---|---|---|---|
| 5,189,552 | A * | 2/1993 | Metwalli | ..................... B60J 3/06 359/486.03 |
| 6,768,586 | B2 * | 7/2004 | Sahouani | ............. G02B 5/3025 349/194 |
| 2012/0107530 | A1 * | 5/2012 | Morishima | ............ B41M 5/405 428/32.31 |

(Continued)

FOREIGN PATENT DOCUMENTS

| CN | 102272658 A | 12/2011 |
|---|---|---|
| CN | 102608796 A | 7/2012 |

(Continued)

*Primary Examiner* — Charles Chang
(74) *Attorney, Agent, or Firm* — Dentons US LLP

(57) ABSTRACT

An optical element and a use of the optical element are provided. The exemplary optical element can be useful in realizing a smart blind having excellent transmission and blocking characteristics in front and lateral surfaces thereof without using a retardation film by employing a polarizing layer whose polarization characteristics are patterned using a guest/host-type dye layer including a polymerizable liquid crystal compound and a dichroic dye. Such an optical element may be applied to various light modulating devices such as smart blinds, smart windows, window protective films, flexible display elements, active retarders for displaying a 3D image, or viewing angle adjustment films.

12 Claims, 12 Drawing Sheets

(a)

(b)

(56) References Cited

U.S. PATENT DOCUMENTS

| | | | |
|---|---|---|---|
| 2015/0153495 A1* | 6/2015 | Matsuda | G02B 5/3016 349/194 |
| 2015/0301250 A1* | 10/2015 | Kim | G02B 27/281 359/486.02 |
| 2015/0309324 A1* | 10/2015 | Kim | G02B 27/281 349/123 |

FOREIGN PATENT DOCUMENTS

| | | | | |
|---|---|---|---|---|
| CN | 103226217 A | | 7/2013 | |
| JP | 2000-160963 | * | 6/2000 | G02B 26/02 |
| JP | 2010-065514 | | 3/2010 | |
| JP | 2013-186132 | * | 9/2013 | G02B 5/30 |
| JP | 2013-186132 A | | 9/2013 | |
| KR | 10-2004-0004138 | | 1/2004 | |
| KR | 10-2010-0089782 | | 8/2010 | |
| KR | 10-2012-0065748 | | 6/2012 | |
| KR | 10-2013-0037126 | | 4/2013 | |
| TW | 562979 B | | 11/2003 | |

* cited by examiner (a)　　　　　　　　　　　　　(b)

(a) Blocking mode (b) Transmission mode (a) Blocking mode (b) Transmission mode (a) Blocking mode (b) Transmission mode

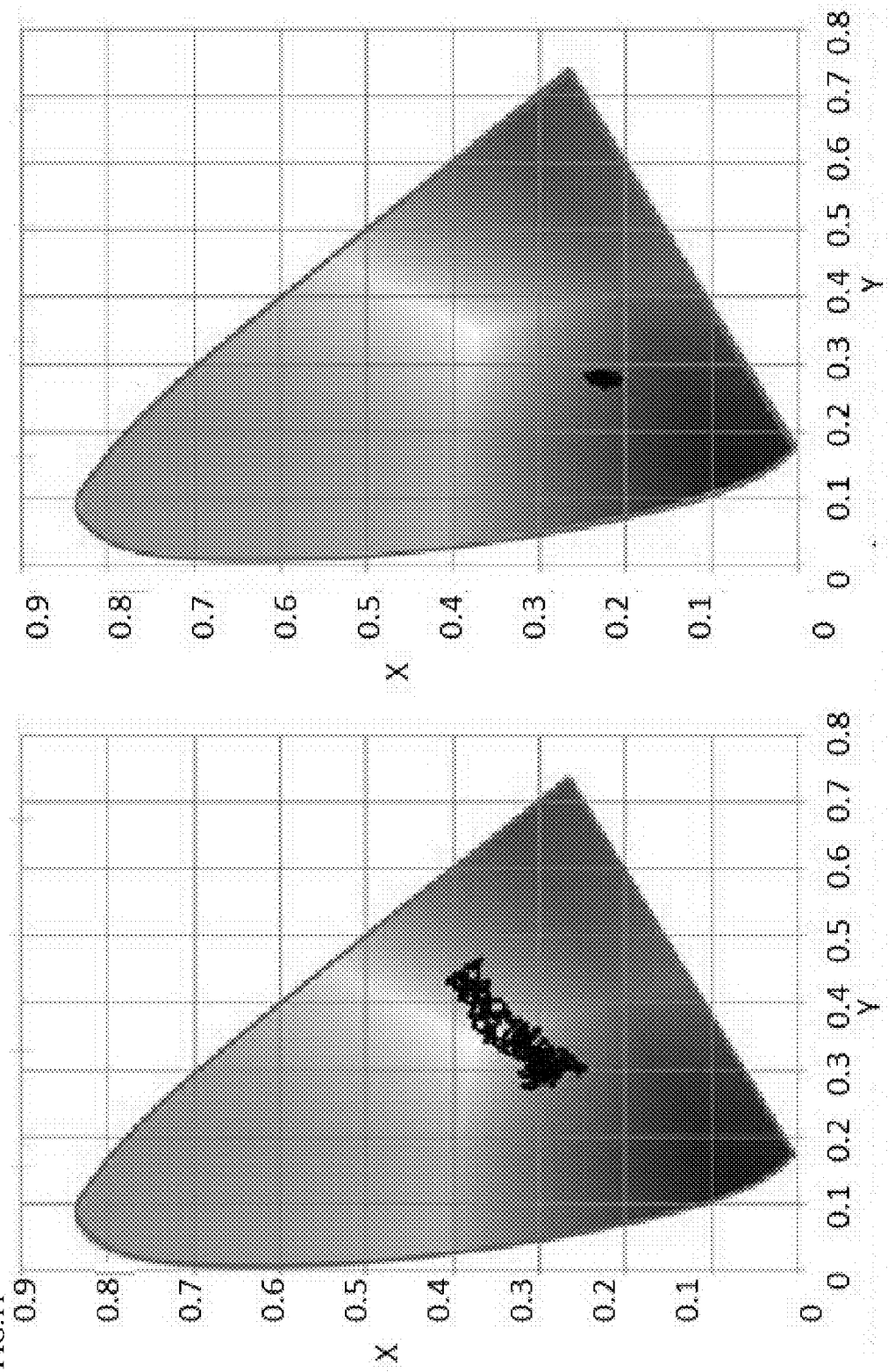

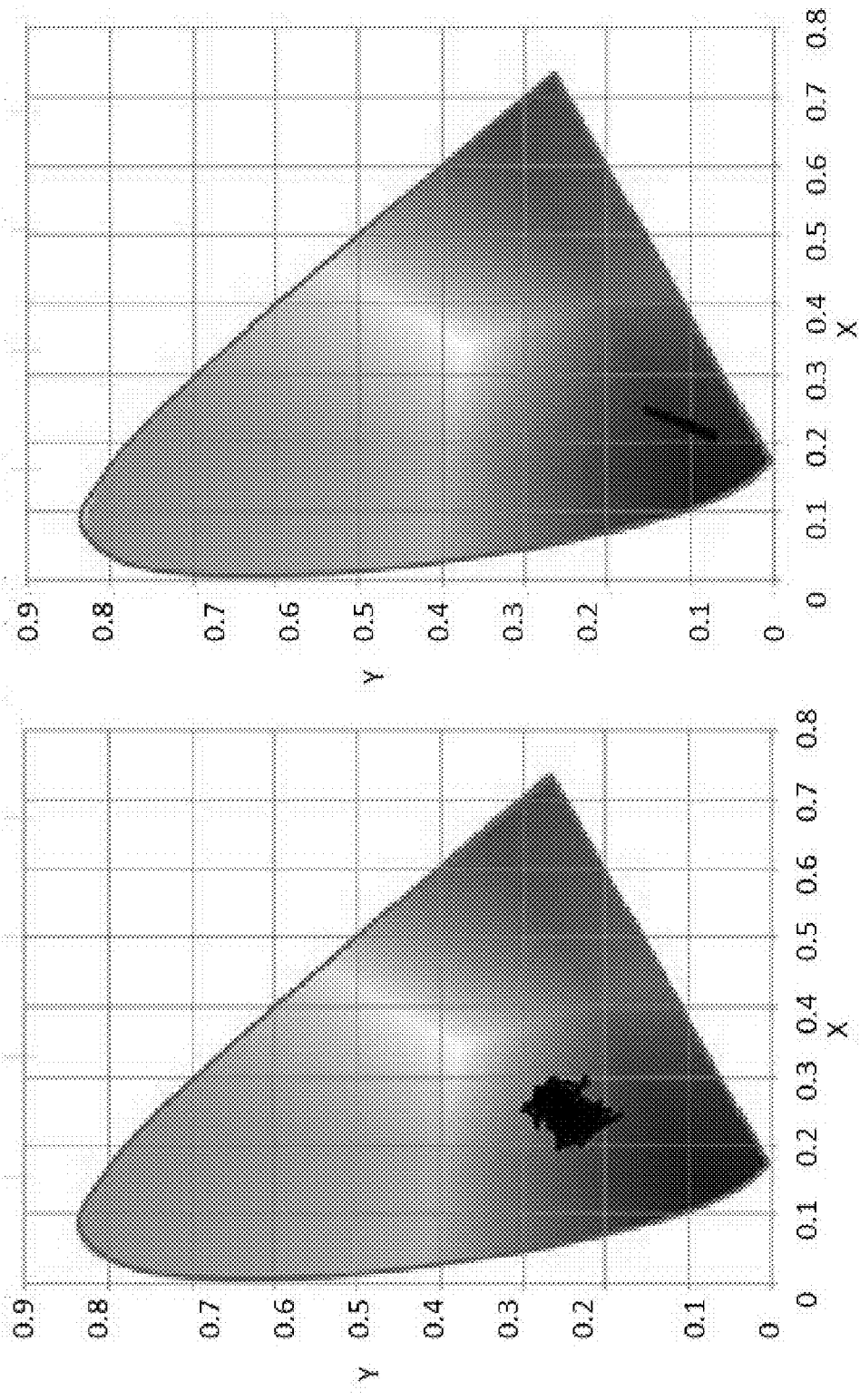

OPTICAL ELEMENT

This application is a Continuation Bypass of International Application No. PCT/KR2014/009169, filed Sep. 30, 2014, and claims the benefit of Korean Application No. 10-2013-0117070, filed on Sep. 30, 2013, and Korean Application No. 10-2014-0130802, filed on Sep. 30, 2014 all of which are hereby incorporated by reference in their entirety for all purposes as if fully set forth herein.

FIELD

The present application relates to an optical element, and a smart blind.

BACKGROUND

In general, a smart blind is a blind capable of adjusting transmittance of light from the sun, and is referred to as a smart window, an electronic curtain, a transmission-variable glass, or a photochromic glass.

For example, the smart blind may be composed of a light transmission rate-adjusting layer capable of adjusting the transmission rate of light, and a driver circuit configured to apply a signal to the light transmission rate-adjusting layer to control the light transmission rate-adjusting layer. The smart blind configured thus may allow light to transmit or not to transmit the entire glass according to a state of applied voltage, and also may vary the shade by controlling the transmission rate. However, the above-described method has a problem in that a power supply system has a complicated structure since an additional external power source should be provided to drive the smart blind.

In recent years, a technique of manufacturing a smart blind by combining a polarizing plate and a retardation film has been developed not to require an additional external power source as disclosed in the patent document 1. A liquid crystal film which is patterned into regions having optical axes in different directions has been generally used as the retardation film. In this case, the retardation film has a problem in that a fine deviation in optical axis on a lateral surface of the smart blind results in ununiformity in optical characteristics, which makes impossible to realize uniform visual sensitivity on the lateral surface of the smart blind.

PRIOR ART DOCUMENT

Patent Document (Patent Document 1) Korean Unexamined Patent Application Publication No. 10-2004-0004138

DETAILED DESCRIPTION

Object

The present application is directed to providing an optical element, and a smart blind.

Solution

One aspect of the present application provides an exemplary optical element including a first polarizing layer and a second polarizing layer which are disposed to face each other. Each of the first and second polarizing layers may include a first region having an absorption axis formed in a first direction, and a second region having an absorption axis formed in a second direction different from the first direction. Also, at least one of the first and second polarizing layers may include a dye layer including a polymerizable liquid crystal compound, and a dichroic dye. Such a dye layer is also referred to as a guest/host-type polarizing element, and may, for example, have an anisotropic optical absorption effect by absorbing light parallel to an arrangement direction of a dichroic dye and transmitting light perpendicular to the arrangement direction of the dye since the dye is arranged together by arrangement of the polymerizable liquid crystal compound.

The exemplary optical element may, for example, be used as the smart blind. In the present invention, the term "smart blind" may refer to a functional member capable of realizing a transmission mode or blocking mode only at a predetermined portion of the blind as well as total transmission mode or blocking mode.

In the present application, the term "polarizing layer" may refer to a functional layer exhibiting anisotropic transmission characteristics with respect to incident light while having a transmission axis formed in one direction. For example, the polarizing layer may have an effect of transmitting light vibrating in one direction from incident light while vibrating in various directions and absorbing light vibrating in the other directions.

The first and second polarizing layers may be disposed so that relative positions of the first and second polarizing layers are changed. As will be described below, the optical element may adjust a light transmission rate, based on a variation in relative positions of the first and second polarizing layers. FIG. 1(a) is a diagram schematically showing an optical element including a first polarizing layer 101 including first and second regions 1011 and 1012 and a second polarizing layer 102 including first and second regions 1021 and 1022 so that the first polarizing layer 101 and the second polarizing layer 102 disposed to face each other, and FIG. 1(b) is a diagram schematically showing an optical element in which the first polarizing layer 101 and the second polarizing layer 102 are disposed so that the relative positions of the first polarizing layer 101 and the second polarizing layer 102 are changed.

Each of the first and second polarizing layers may include a first region having an absorption axis formed in a first direction, and a second region having an absorption axis formed in a second direction different from the first direction, for example, a direction perpendicular to the first direction. For example, the first regions 1011 and 1012 and the second regions 1021 and 1022 of such first and second polarizing layers may be alternately disposed to each other while having a stripe shape extending in a common direction, as shown in FIGS. 2 and 3. The interval and pitch of the stripe shape are not particularly limited, and may be properly selected according to the desired use of the optical element.

In the optical element, for example, the first region 1011 of the first polarizing layer and the first region 1021 of the second polarizing layer are disposed in a state in which the first region 1011 of the first polarizing layer faces the first region 1021 of the second polarizing layer, as shown in FIG. 1(a). In this case, in the optical element, the first region 1011 of the first polarizing layer and the first region 1021 of the second polarizing layer may, for example, be disposed so that the absorption axes (↔) of the first region 1011 of the first polarizing layer and the first region 1021 of the second polarizing layer are parallel to each other, and the second region 1012 of the first polarizing layer and the second region 1022 of the second polarizing layer may be disposed so that the absorption axes (↔) of the second region 1012 of the first polarizing layer and the second region 1022 of the second polarizing layer are parallel to each other. In this case, the optical element may intactly transmit polarized light of incident light in a direction parallel to the absorption axes of the facing regions of the first and second polarizing layers.

In the optical element, the relative positions of the first and second polarizing layers may, for example, be changed to switch to a second state in which the first region 1011 of the first polarizing layer disposed to face the first region 1021 of the second polarizing layer faces the second region 1022 of the second polarizing layer, as shown in FIG. 1(*b*). The absorption axes (↔) of the facing first and second regions 1011 and 1022 of the first and second polarizing layers may be perpendicular to each other. In this case, the optical element may block incident light since the absorption axes (↔) of the facing regions of the first and second polarizing layers are perpendicular to each other.

As described above, one of the first and second polarizing layers may be the guest/host-type dye layer, and both of the first and second polarizing layers may be the guest/host-type dye layers. When one of the first and second polarizing layers is the guest/host-type dye layer, the other polarizing layer may be a combination of a patterned retardation film and a polarizer having a transmission axis formed in one direction. However, both of the first and second polarizing layers are preferably the guest/host-type dye layers in an aspect that a smart blind having excellent desired transmission and blocking characteristics is realized in the present application.

For example, the guest/host-type dye layer may be a coating layer of a polarizing material including a polymerizable liquid crystal compound and a dichroic dye. Therefore, the optical element may be simply and continuously manufactured using a roll-to-roll process, and also thin elements may be realized through structural simplicity.

In the present application, the term "polymerizable liquid crystal compound" may refer to a compound including a moiety capable of exhibiting liquid crystallinity, for example, a mesogen backbone, and the like, and containing at least one polymerizable functional group. For example, the polymerizable liquid crystal compound may be included in a polarizing layer in a polymerized state. In the present invention, the term "polymerizable liquid crystal compound included in a polymerized state" may means that the liquid crystal compound is polymerized to form a backbone, such as a main chain or aide chain of a liquid crystal polymer, in the polarizing layer.

For example, a compound represented by the following Formula 1 may be used as the polymerizable liquid crystal compound:

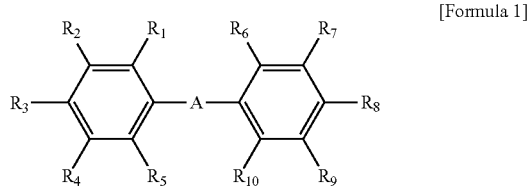

[Formula 1]

In Formula 1,
A is a single bond, —COO—, or —COO—, and $R_1$ to $R_{10}$ are each independently hydrogen, a halogen, an alkyl group, an alkoxy group, an alkoxycarbonyl group, a cyano group, a nitro group, —O-Q-P, or a substituent of the following Formula 2, provided that at least one of the substituents $R_1$ to $R_{10}$ is —O-Q-P, or a substituent of the following Formula 2, or the two adjacent substituents of $R_1$ to $R_5$ and the two adjacent substituents of $R_6$ to $R_{10}$ are joined together to form a benzene ring substituted with —O-Q-P, where Q is an alkylene group, or an alkylidene group, and P is a polymerizable functional group such as an alkenyl group, an epoxy group, a cyano group, a carboxyl group, an acryloyl group, a (meth)acryloyl group, an acryloyloxy group, or a (meth)acryloyloxy group:

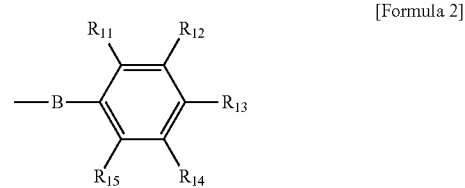

[Formula 2]

In Formula 2, B is a single bond, —COO—, or —COO—, and $R_{11}$ to $R_{15}$ are each independently hydrogen, a halogen, an alkyl group, an alkoxy group, an alkoxycarbonyl group, a cyano group, a nitro group or —O-Q-P, provided that at least one of the substituents $R_{11}$ to $R_{15}$ is —O-Q-P, or the two adjacent substituents of $R_{11}$ to $R_{15}$ are joined together to form a benzene ring substituted with —O-Q-P, where Q is an alkylene group, or an alkylidene group, and P is a polymerizable functional group such as an alkenyl group, an epoxy group, a cyano group, a carboxyl group, an acryloyl group, a (meth)acryloyl group, an acryloyloxy group, or a (meth)acryloyloxy group.

In Formulas 1 and 2, the expression "two adjacent substituents are joined together to form a benzene ring substituted with —O-Q-P" may mean that the two adjacent substituents are joined together to form a naphthalene backbone substituted with —O-Q-P as a whole.

In Formula 2, the symbol "—" indicated on the left side of B may mean that B is directly bound to the benzene ring of Formula 1.

In Formulas 1 and 2, the term "single bond" means that no additional atoms are present in a moiety represented by A or B. For example, when A in Formula 1 is a single bond, the benzene rings disposed on both sides of A may be directly bound to form a biphenyl structure.

In Formulas 1 and 2, the halogen that may be used herein may include chlorine, bromine, or iodine.

Unless particularly defined otherwise in the present application, the term "alkyl group" may refer to a linear or branched alkyl group having 1 to 20 carbon atoms, 1 to 16 carbon atoms, 1 to 12 carbon atoms, 1 to 8 carbon atoms, or 1 to 4 carbon atoms, or a cycloalkyl group having 3 to 20 carbon atoms, 3 to 16 carbon atoms, or 4 to 12 carbon atoms. The alkyl group may be optionally substituted with one or more substituents.

Unless particularly defined otherwise in the present application, the term "alkoxy group" may refer to an alkoxy group having 1 to 20 carbon atoms, 1 to 16 carbon atoms, 1 to 12 carbon atoms, 1 to 8 carbon atoms, or 1 to 4 carbon atoms. The alkoxy group may be linear, branched or cyclic. Also, the alkoxy group may be optionally substituted with one or more substituents.

Also, unless particularly defined otherwise in the present application, the term "alkylene group" or "alkylidene group" may refer to an alkylene or alkylidene group having 1 to 12 carbon atoms, 4 to 10 carbon atoms, or 6 to 9 carbon atoms.

The alkylene or alkylidene group may be linear, branched or cyclic. Also, the alkylene or alkylidene group may be optionally substituted with one or more substituents.

Also, unless particularly defined otherwise in the present application, the term "alkenyl group" may refer to an alkenyl group having 2 to 20 carbon atoms, 2 to 16 carbon atoms, 2 to 12 carbon atoms, 2 to 8 carbon atoms, or 2 to 4 carbon atoms. The alkenyl group may be linear, branched or cyclic. Also, the alkenyl group may be optionally substituted with one or more substituents.

Further, in Formulas 1 and 2, P may be preferably an acryloyl group, a (meth)acryloyl group, an acryloyloxy group, or a (meth)acryloyloxy group, more preferably an acryloyloxy group, or a (meth)acryloyloxy group, and most preferably an acryloyloxy group.

In the present application, the substituent which may be substituted with a certain functional group may include an alkyl group, an alkoxy group, an alkenyl group, an epoxy group, an oxo group, an oxetanyl group, a thiol group, a cyano group, a carboxyl group, an acryloyl group, a (meth)acryloyl group, an acryloyloxy group, a (meth)acryloyloxy group, or an aryl group, but the present invention is not limited thereto.

The polymerizable liquid crystal compound may, be included in the polarizing layer in a horizontally aligned state. In the present invention, the term "horizontal alignment" may mean that the optical axis of a polarizing layer including a polymerized liquid crystal compound has an inclination angle of approximately 0° to approximately 25°, approximately 0° to approximately 15°, approximately 0° to approximately 10°, approximately 0° to approximately 5°, or approximately 0° with respect to a plane of the polarizing layer.

In the present application, the term "dye" may refer to a material capable of intensively absorbing and/or deforming light in at least a partial or entire wavelength range of a visible light region, for example, a wavelength range of 400 nm to 700 nm, and the term "dichroic dye" may refer to a material capable of anisotropically absorbing light in at least a partial or entire wavelength range of a visible light region.

For example, a dye known to be able to form a guest/host-type polarizing element, for example, a dye known to have a property of being arranged according to the alignment of the polymerizable liquid crystal compound may be selected and used as the dichroic dye. For example, a known dye such as an azo dye or an anthraquinone dye may be used as such a dichroic dye. Specifically, the dichroic dye that may be used herein may include an azo dye such as F355 (a registered trademark), F357 (a registered trademark) or F593 (a registered trademark) (commercially available from Nippon Kankoh Shikiso kenkyusho Ltd.), or types of dyes known to have an equivalent effect to the above-described dyes, but the present invention is not limited thereto.

The dichroic ratio of the dichroic dye may be properly selected without causing damage to desired physical properties. In the present invention, the dichroic ratio may refer to a value obtained by dividing absorption of polarized light parallel to a long axis direction of the dichroic dye by absorption of polarized light parallel to a direction perpendicular to the long axis direction. For example, the dichroic dye may have a dichroic ratio of 5 or more, 6 or more, or 7 or more. The dichroic dye may, for example, satisfy the dichroic ratio at at least partial wavelengths or one wavelength in a wavelength range of a visible light region, for example, a wavelength range of approximately 380 nm to 700 nm, or approximately 400 nm to 700 nm. An upper limit of the dichroic ratio may, for example, be less than or equal to approximately 20, 18, 16, or 14.

As described above, the optical element may be used to realize a smart blind, which exhibits uniform polarization characteristics in front and lateral surfaces thereof, and has excellent transmission and blocking characteristics as a whole, by employing the polarizing layer whose polarization characteristics are patterned using the guest/host-type dye layer including the polymerizable liquid crystal compound and the dichroic dye.

Meanwhile, FIG. 4 is a diagram schematically showing a configuration of a conventional smart blind using a combination of a polarizing plate and a liquid crystal film. Generally, the smart blind shown in FIG. 4 has a structure in which polarizing units, which include polarizing layers 401 and 404 having transmission axes formed in one direction, and patterned retardation films 402 and 403 patterned with regions having optical axes (↔) formed in different directions, are disposed to face each other. In the case of the smart blind shown in FIG. 4, the polarization characteristics of light incident on the optical element are adjusted according to a change in optical axes of the patterned retardation films. In this case, since a deviation in optical axis may occur as viewed from a lateral surface of the smart blind, uniform polarization characteristics may not be realized at a lateral surface of the smart blind. Thus, the smart blind has a problem in that it is difficult to realize uniform visual sensitivity at a lateral surface thereof, that is, visual sensitivity changes according to a direction in which the smart blind is viewed. On the other hand, the optical element according to one exemplary embodiment of the present invention may exhibit uniform polarization characteristics even at a lateral surface thereof since the polarization characteristics light to be incident may be adjusted according to the absorption axis which is patterned on the polarizing layer itself.

The optical element may further include an alignment film present on one surface of each of the first and second polarizing layers. FIG. 5 is a diagram schematically showing an alignment film 501 including alignment regions aligned in different directions, and a guest/host-type dye layer 502 present on the alignment film.

Any types of alignment films may be used as the alignment film as long as they can properly adjust alignment of the polymerizable liquid crystal compound in the adjacent polarizing layers. For example, a contact alignment film such as a rubbing alignment film, or an alignment film including a photo-alignment film compound, which is known to be able to exhibit alignment characteristics by means of a non-contact alignment method such as irradiation with linearly polarized light, may be used as the alignment film.

For example, a photo-alignment film including a photo-alignable compound may be used as the alignment film. In the present invention, the term "photo-alignable compound" may refer to a compound which is orientationally ordered by irradiation with light, and can align adjacent liquid crystal compounds in a predetermined direction. The alignable compound may be a single-molecule compound, a monomeric compound, an oligomeric compound, or a polymeric compound.

The photo-alignable compound may be a compound containing a photosensitive moiety. Photo-alignable compounds that may be used for alignment of the liquid crystal compound have been widely known in the related art. For example, the photo-alignable compound that may be used herein may include a compound ordered by trans-cis photoisomerization; a compound ordered by photo-destruction such as chain scission, or photo-oxidation; a compound ordered by photo-crosslinking or photo-polymerization such as [2+2] cycloaddition, [4+4] cycloaddition, or photodimerization; a compound ordered by photo-Fries rearrangement; or a compound ordered by a ring opening/closure reaction. Examples of the compound ordered by the trans-cis photoisomerization may, for example, include an azo compound such as a sulfonated diazo dye, or an azo polymer, or a stilbene compound, and examples of the compound ordered by the photo-destruction may include cyclobutane-1,2,3,4-tetracarboxylic dianhydride, aromatic polysilane or polyester, polystyrene, or polyimide. Also, examples of the compound ordered by the photo-crosslinking or photo-polymerization may include a cinnamate compound, a coumarin compound, a cinnamamide compound, a tetrahydrophthalimide compound, a maleimide compound, a benzophenone compound, a diphenylacetylene compound, a compound (hereinafter referred to as a "chalcone compound") containing a chalconyl moiety as a photosensitive moiety, or a compound (hereinafter referred to as a "anthracenyl compound") containing an anthracenyl moiety, examples of the compound ordered by the photo-Fries rearrangement may include an aromatic compound such as a benzoate compound, a benzoamide compound, or a (meth) acrylamidoaryl (meth)acrylate compound, and examples of the compound ordered by the ring opening/closure reaction may include a compound, such as a spiropyran compound, which is ordered by a ring opening/closure reaction of a [4+2] π-electronic system, but the present invention is not limited thereto.

The photo-alignable compound may be a single-molecule compound, a monomeric compound, an oligomeric compound or a polymeric compound, or may be in the form of a blend of the photo-alignable compound and a polymer. As described above, the oligomeric or polymeric compound may have the above-described photosensitive moiety or a moiety derived from the above-described photo-alignable compound. In this case, the photo-alignable compound-derived moiety or photosensitive moiety may be present in the main chain or the side chain of the oligomeric or polymeric compound.

Examples of the polymer which has the photo-alignable compound-derived moiety or photosensitive moiety or may be mixed with the photo-alignable compound may include polynorbornene, polyolefin, polyarylate, polyacrylate, poly (meth)acrylate, polyimide, poly(amic acid), polymaleimide, polyacrylamide, poly(meth)acrylamide, polyvinyl ether, polyvinyl ester, polystyrene, polysiloxane, polyacrylonitrile, or poly(meth)acrylonitrile, but the present invention is not limited thereto.

Representative examples of the polymer that may be included in the alignable compound may include polynorbornene cinnamate, polynorbornene alkoxy cinnamate, polynorbornene allyloyloxy cinnamate, polynorbornene fluorinated cinnamate, polynorbornene-chlorinated cinnamate, or polynorbornene dicinnamate, but the present invention is not limited thereto.

When the alignable compound is a polymeric compound, the compound may, for example, have a number average molecular weight of approximately 10,000 g/mol to 500,000 g/mol, but the present invention is not limited thereto.

A alignment layer or a precursor for forming the alignment layer may include a photoinitiator in addition to the photo-alignable compound. For example, photoinitiators may be may be without particular limitation as long as they can induce a free radical reaction by irradiation with light. Examples of such a photoinitiator may include an α-hydroxyketone compound, an α-aminoketone compound, a phenyl glyoxylate compound, or an oxime ester compound. For example, an oxime ester compound may be used as the photoinitiator. The ratio of the photoinitiator in the precursor is not particularly limited, and the photoinitiator may be included at a ratio at which a proper reaction may be induced.

The alignment of the photo-alignment film may be performed to include first and second alignment regions which are aligned in different directions. This alignment process may be performed by irradiation with linearly polarized light. During the alignment process, at least a portion of the alignment layer may be simultaneously or sequentially exposed to different kinds of linearly polarized light which are polarized in different directions.

Also, the optical element may further include a base layer present any one surface of each of the first and second polarizing layers. When the optical element further includes an alignment film, the alignment film and the polarizing layer may be sequentially formed on the base layer. Materials of the base layer known in the related art may be used as the base layer without limitation. For example, an inorganic film such as a glass film, a crystalline or amorphous silicon film, or a quartz or indium tin oxide (ITO) film, or a plastic film may be used as the base layer. Also, an optically isotropic substrate, or an optically anisotropic substrate such as a retardation layer may be used as the base layer.

Examples of the plastic substrate that may be used herein may include a substrate including triacetyl cellulose (TAC); a cycloolefin copolymer (COP) such as a norbornene derivative; poly(methyl methacrylate) (PMMA); polycarbonate (PC); polyethylene (PE); polypropylene (PP); polyvinyl alcohol (PVA); diacetyl cellulose (DAC); polyacrylate (Pac); polyether sulfone (PES); polyetheretherketone (PEEK); polyphenylsulfone (PPS); polyetherimide (PEI); polyethylene naphthalate (PEN); poly(ethylene terephthalate) (PET); polyimide (PI); polysulfone (PSF); polyarylate (PAR); or an amorphous fluorine resin, but the present invention is not limited thereto. As necessary, a coating layer formed of gold, silver, or a silicon compound such as silicon dioxide or silicon monoxide, or a coating layer such as an anti-reflection layer may be present in the base layer.

Another aspect of the present application provides a use of the optical element. As described above, the optical element may adjust a light transmission rate, based on a change in relative positions of the first and second polarizing layers, and may, for example, switch between a transmission mode and a blocking mode. Also, the optical element may be used to realize a smart blind having excellent transmission and blocking characteristics in front and lateral surfaces thereof without using an additional retardation film by employing the polarizing layer whose polarization characteristics are patterned using the guest/host-type dye layer including the polymerizable liquid crystal compound and the dichroic dye. For example, such an optical element may be used as a light modulating device. Examples of the light modulating device may include a smart blind, a smart window, a window protective film, a flexible display element, an active retarder for displaying a 3D image, or a viewing angle adjustment film, but the present invention is not limited thereto. A method of constituting the light modulating device is not particularly limited. For example, conventional methods may be applied to the light modulating device as long as the optical element is used as the light modulating device.

Effect

A optical element of the present application can be useful in realizing a smart blind having excellent transmission and blocking characteristics in front and lateral surfaces thereof without using an additional retardation film by employing a polarizing layer whose polarization characteristics are patterned using a guest/host-type dye layer including a polymerizable liquid crystal compound and a dichroic dye. For example, such an optical element may be applied to various light modulating devices such as smart blinds, smart windows, window protective films, flexible display elements, active retarders for displaying a 3D image, or viewing angle adjustment films.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which:

FIG. 11 shows the results obtained by measuring changes in color on the lateral surfaces of the optical elements of Example 1 and Comparative Example 1 in the transmission mode; and FIG. 12 shows the results obtained by measuring changes in color on the lateral surfaces of the optical elements of Example 1 and Comparative Example 1 in the blocking mode.

DETAILED DESCRIPTION OF EXEMPLARY EMBODIMENTS

Hereinafter, the present invention will be described in more detail by Examples according to the present invention; however the scope of the present invention is not limited to the below.

Example 1

One surface of a glass was coated with a composition for forming a photo-alignment film so that the thickness of the composition after drying amounted to approximately 1,000 Å, and dried at 80° C. for 2 minutes in an oven. A composition prepared by dissolving 5-norbornene-2-methyl cinnamate (commercially available from LG Chem Ltd.) in a toluene solvent so that the solid concentration amounted to 2% by weight was used as the above-described composition for forming a photo-alignment film.

Figure 1:
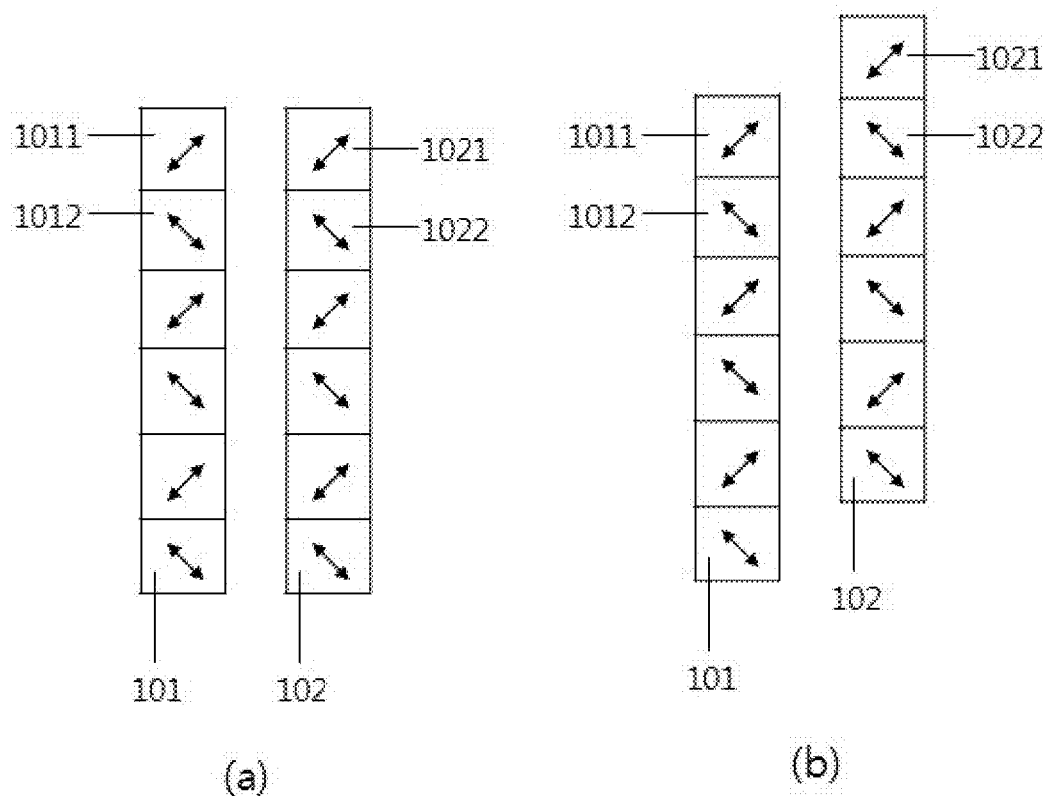
FIG. 1 is a diagram schematically showing an optical element according to one exemplary embodiment of the present invention.
Figure 2:
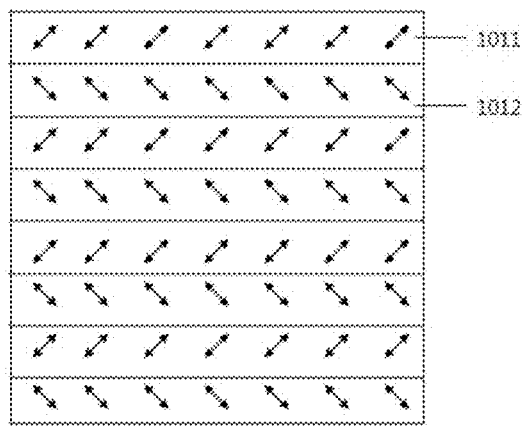
FIGS. 2 to 3 are diagrams schematically showing first and second polarizing layers, respectively.
Figure 3:
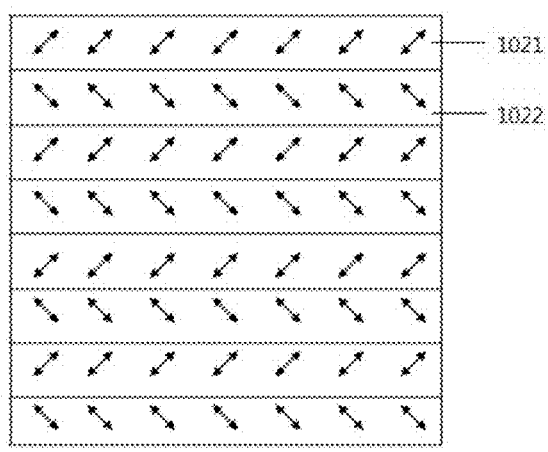
Figure 4:
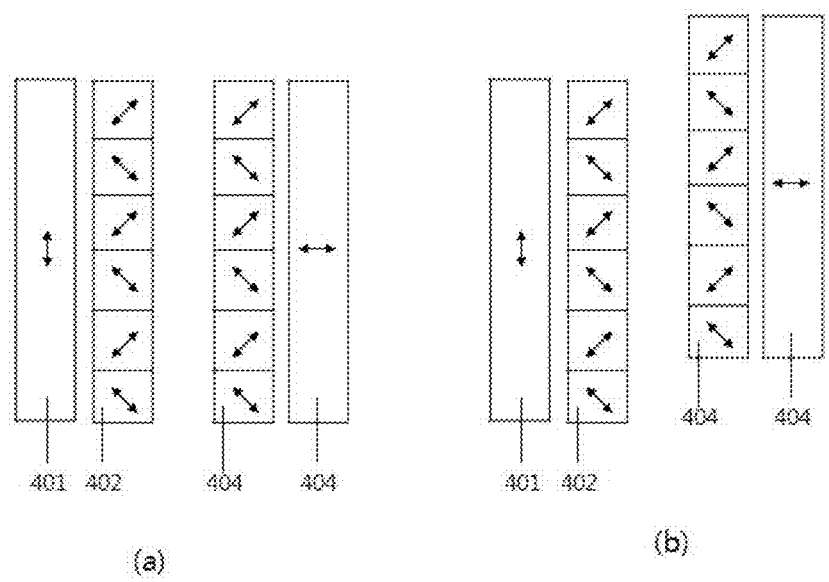
FIG. 4 is a diagram schematically showing a conventional smart blind.
Figure 5:
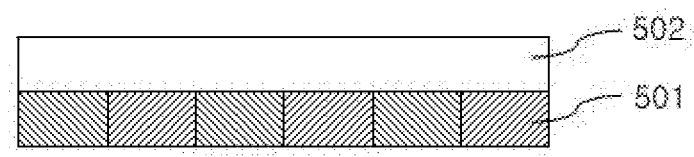
FIG. 5 is a diagram schematically showing an alignment film and a guest/host-type dye layer.
Figure 6:
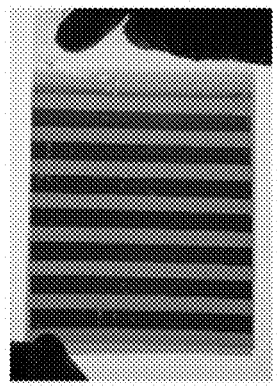
FIG. 6 shows an image of a first polarizing layer prepared in Example 1.

Next, the dried composition for forming a photo-alignment film was aligned according to the method disclosed in Korean Patent Application No. 10-2010-0009723 to form a photo-alignment film including first and second alignment regions which were aligned in different directions. Specifically, a pattern mask in which light-transmitting portions and light-blocking portions in stripe shapes having a width of approximately 450 μm were alternately formed in vertical and horizontal directions was disposed on an upper portion of the dried composition, and a polarizing plate having two regions formed thereon for transmitting two different kinds of polarized light was also disposed on an upper portion of the pattern mask. Thereafter, the composition for forming an optical alignment layer was aligned by irradiating the composition with UV rays (300 mW/cm$^2$) for approximately 30 seconds by means of the polarizing plate and the pattern mask while transferring the glass having the photo-alignment film formed thereon at a rate of approximately 3 m/min. Then, a polarizing composition (G241:LC242=1:20 (parts by weight)) including a dichroic dye (G241 commercially available from Nagase & Co., Ltd.) and a polymerizable liquid crystal compound (LC 242 commercially available from BASF) was coated onto the alignment layer undergoing the alignment treatment to a dry thickness of approximately 1 μm, and then aligned according to alignment of the alignment layer arranged under the glass. Then, a polarizing material layer, which had first and second regions formed therein to have different optical axes perpendicular to each other according to the alignment of the photo-alignment film arranged under the glass, was formed by irradiating liquid crystals with UV rays (300 mW/cm$^2$) for approximately 10 seconds to cross-link and polymerize the liquid crystals, thereby preparing a first polarizing layer. FIG. 6 shows an image of the first polarizing layer prepared in Example 1.

Subsequently, a second polarizing layer was prepared in the same method as the method of preparing the first polarizing layer, and the first and second polarizing layers were then disposed to face each other, thereby manufacturing a smart blind.

Figure 7:
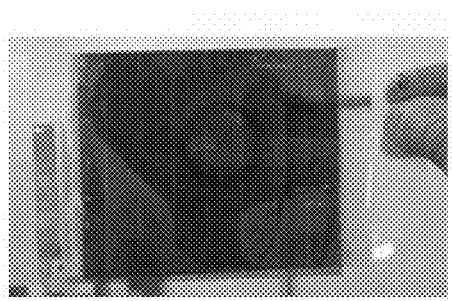
FIG. 7 shows images of a front surface of the optical element of Example 1 in a blocking mode (a) and a transmission mode (b)
Figure 7:
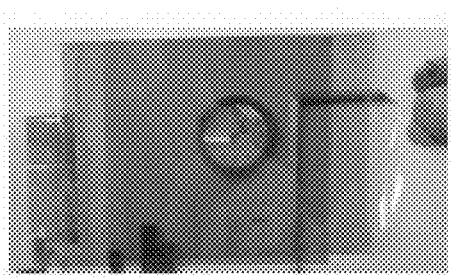
Figure 8:
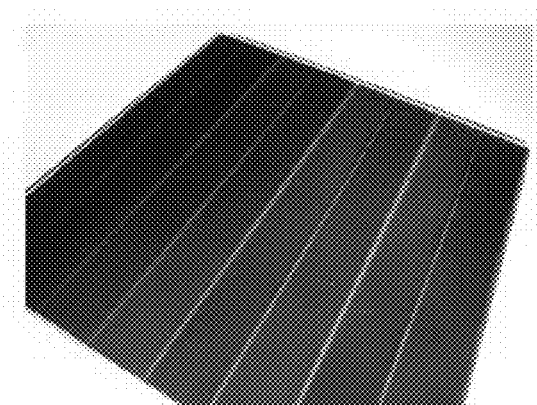
FIG. 8 shows images of a lateral surface of the optical element of Example 1 in a blocking mode (a) and a transmission mode (b)
Figure 8:
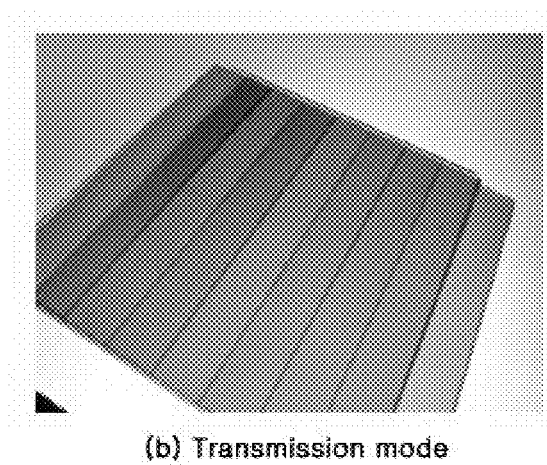

The transmission mode (white mode) was realized by disposing the facing regions of the first and second polarizing layers so that the absorption axes of the facing regions were parallel to each other, and the blocking mode (black mode) was realized by disposing the facing regions of the first and second polarizing layers so that the absorption axes of the facing regions were perpendicular to each other. FIG. 7 shows images of a front surface of the smart blind of Example 1 in a blocking mode (a) and a transmission mode (b). Also, FIG. 8 shows images of a lateral surface of the smart blind of Example 1 in a blocking mode (a) and a transmission mode (b), as observed at an angle of approximately 30° to 50° with respect to the front surface. As shown in FIGS. 7 and 8, it could be seen that the smart blind of Example 1 showed uniform polarization characteristics, as observed from the front and lateral surfaces thereof, and that the smart blind of Example 1 generally had excellent transmission and blocking characteristics.

Comparative Example 1

A ¼ wavelength plate in which first and second regions having optical axes perpendicular to each other were alternately disposed to each other while having a stripe shape extending in a common direction was stacked on a polarizing layer having an absorption axis formed in one direction to manufacture a first polarizing unit. Thereafter, a second polarizing unit was manufactured in the same method as the method of manufacturing the first polarizing unit. An iodine-stained PVA-stretched film (commercially available from LG Chem Ltd.) was used as the polarizing layer, and a liquid crystal film, which was prepared by coating a liquid crystal composition including a polymerizable liquid crystal compound (LC 242 commercially available from BASF) onto the photo-alignment film prepared in Example 1 to a dry thickness of approximately 1 μm, alignment, aligning the liquid crystal composition aligned according to alignment of the alignment film arranged under the PVA-stretched film, and irradiating liquid crystals with UV rays (300 mW/cm$^2$) for approximately 10 seconds to cross-link and polymerize the liquid crystals, was used as the ¼ wavelength plate.

Next, the first and second polarizing units were disposed so that the ¼ wavelength plates of the first and second polarizing units faced each other. In this case, the polarizing layers of the first and second polarizing units were disposed so that the absorption axes of the polarizing layers were perpendicular to each other, thereby manufacturing a smart blind of Comparative Example 1.

Figure 9:
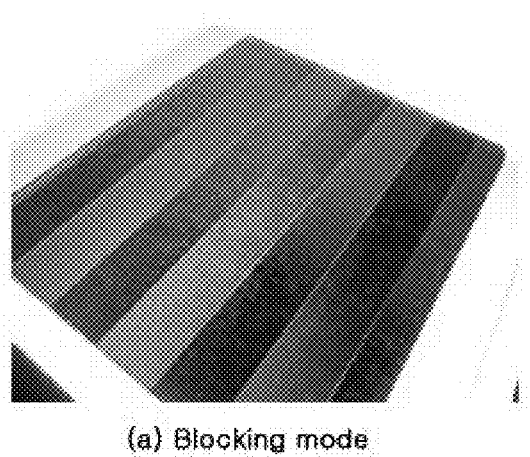
FIG. 9 shows images of a lateral surface of an optical element of Comparative Example 1 in a blocking mode (a) and a transmission mode (b)
Figure 9:
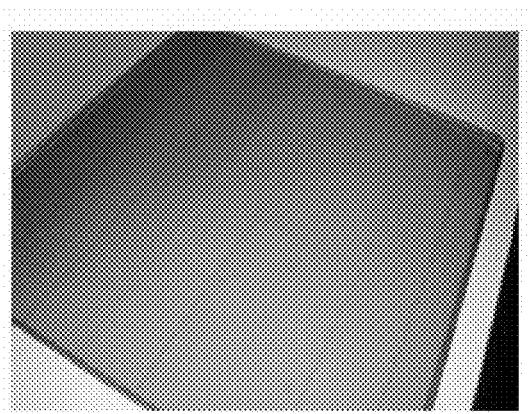

The transmission mode (white mode) was realized by disposing the facing ¼ wavelength plates of the first and second polarizing units so that the optical axes of the regions of the facing ¼ wavelength plates were parallel to each other, and the blocking mode (black mode) was realized by changing a relative position of the second polarizing unit so that the optical axes of the regions of the facing ¼ wavelength plates were perpendicular to each other. FIG. 9 shows images of a lateral surface of the smart blind of Comparative Example 1 in a blocking mode (a) and a transmission mode (b), as observed at an angle of approximately 30° to 50° with respect to the front surface. As shown in FIG. 9, it could be seen that the smart blind of Comparative Example 1 did not have uniform polarization characteristics due to a deviation in optical axis, as observed from the lateral surface thereof, and thus uniform visual sensitivity was not realized at the lateral surface of the smart blind.

Evaluation Example 1

Observation of Change in Color in Lateral Surface of Smart Blind

Figure 10:
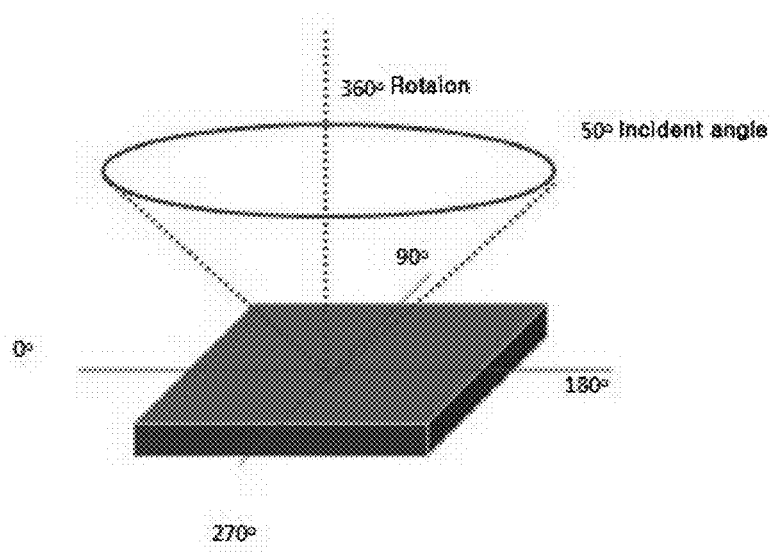
FIG. 10 shows a principle of measuring a change in color on a lateral surface of the optical element in Evaluation Example 1.

Each of the optical elements manufactured in Example 1 and Comparative Example 1 was disposed on a back light unit (BLU) to realize the above-described transmission mode (white mode) or blocking mode (black mode), and changes in color of the optical elements were measured at an incidence angle of 50° whiling rotating the optical elements at an angle of 360° using ELDIM equipment, as shown in FIG. 10. The results are shown in FIGS. 11 and 12, and listed in the following Table 1. In the following Table 1, Δx represents a difference between the maximum and minimum values of the x-coordinate, and Δy represents a difference between the maximum and minimum values of the y-coordinate.

TABLE 1

| | Transmission mode (White mode) | | Blocking mode (Black mode) | |
| --- | --- | --- | --- | --- |
| | Δx | Δy | Δx | Δy |
| Example 1 | 0.024 | 0.042 | 0.048 | 0.086 |
| Comparative Example 1 | 0.195 | 9.160 | 0.103 | 0.118 |

As shown in FIGS. 11 and 12 and listed in Table 1, it could be seen that the change in color was more significant in the case of the smart blind of Comparative Example 1 using a combination of the liquid crystal film and the polarizing plate, compared to the smart blind of Example 1. From these facts, it could be seen that it was difficult to realize the uniform visual sensitivity at the lateral surface of the smart blind of Comparative Example 1. Particularly, as shown in FIG. 9B, it was revealed that the smart blind of Comparative Example 1 had no uniform color but had yellow and blue colors when the lateral surface of the smart blind was viewed in the transmission mode (white mode). This was derived from the fact that the change in color from yellow to blue occurred in the case of the smart blind of Comparative Example 1 as the smart blind rotated in the transmission mode (white mode), as shown in FIG. 11A.

EXPLANATION OF THE MARKS IN THE DRAWINGS

101, 102: a first and second polarizing layer
1011, 1021: a first region
1021, 1022: a second region
401, 404: a polarizing layer having transmission axes formed in one direction
402, 403: a patterned retardation film
501: an alignment film
502: a guest/host-type dye layer

What is claimed is:

1. An optical element comprising first and second polarizing layers disposed to face each other, each of the first and second polarizing layers comprising a first region having an absorption axis formed in a first direction, and a second region having an absorption axis formed in a second direction different from the first direction,
   wherein each of the first and second polarizing layers is a guest/host-type dye layer comprising a polymerizable liquid crystal compound, and a dichroic dye,
   wherein the first and second polarizing layers are disposed to allow for change in relative positions of the first and second polarizing layers to switch from a first state in which the first region of the first polarizing layer is disposed to face the first region of the second polarizing layer to a second state in which the first region of the first polarizing layer faces the second region of the second polarizing layer, and
   wherein the optical element is switched between a transmission mode and a blocking mode based on a change in relative positions of the first and second polarizing layers.

2. The optical element of claim 1, wherein the first and second regions are alternately disposed to each other while having a stripe shape extending in a common direction.

3. The optical element of claim 1, wherein the first region of the first polarizing layer and the first region of the second polarizing layer are disposed so that the absorption axes of the first region of the first polarizing layer and the first region of the second polarizing layer are parallel to each other, and the second region of the first polarizing layer and the second region of the second polarizing layer are disposed so that the absorption axes of the second region of the first polarizing layer and the second region of the second polarizing layer are parallel to each other.

4. The optical element of claim 1, wherein the first region of the first polarizing layer and the second region of the second polarizing layer are disposed so that the absorption axes of the first region of the first polarizing layer and the second region of the second polarizing layer are perpendicular to each other, and the second region of the first polarizing layer and the first region of the second polarizing layer are disposed so that the absorption axes of the second region of the first polarizing layer and the first region of the second polarizing layer are perpendicular to each other.

5. The optical element of claim 1, wherein the dye layer is a coating layer of a polarizing material comprising a polymerizable liquid crystal compound, and a dichroic dye.

6. The optical element of claim 1, wherein the polymerizable liquid crystal compound is included in the first polarizing layer or the second polarizing layer in a state in which the polymerizable liquid crystal compound is aligned in a horizontal direction.

7. The optical element of claim 1, wherein the dichroic dye exhibits the maximum absorbance in a wavelength range of 400 nm to 700 nm.

8. The optical element of claim 1, wherein the dichroic dye has a dichroic ratio of 5 or more.

9. The optical element of claim 1, further comprising an alignment film formed at one surface of each of the first and second polarizing layers.

10. The optical element of claim 9, wherein the alignment film is a photo-alignment film comprising a photo-alignable compound.

11. The optical element of claim 1, further comprising a base layer formed at one surface of each of the first and second polarizing layers.

12. A smart blind comprising the optical element defined in claim 1.

* * * * *